US007054149B2

(12) United States Patent
Lev et al.

(10) Patent No.: US 7,054,149 B2
(45) Date of Patent: May 30, 2006

(54) SLIDING LATCHING MECHANISM

(75) Inventors: Jeffrey A. Lev, Cypress, TX (US); Earl W. Moore, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/954,067

(22) Filed: Sep. 29, 2004

(65) Prior Publication Data

US 2006/0067038 A1 Mar. 30, 2006

(51) Int. Cl.
*G06F 1/16* (2006.01)

(52) U.S. Cl. .......................... 361/683; 292/81; 16/431; 137/625.5

(58) Field of Classification Search ........ 361/679–687, 361/724–727; 292/251.5, 80–81, 87.89, 292/98; 16/430–431, 239.292; 280/624; 137/625.5
See application file for complete search history.

(56) References Cited

U.S. PATENT DOCUMENTS

| | | | | |
|---|---|---|---|---|
| 6,507,485 | B1 | 1/2003 | Zadesky | |
| 6,517,129 | B1 | 2/2003 | Chien et al. | |
| 6,653,919 | B1 | 11/2003 | Shih-Chung et al. | |
| 6,659,516 | B1 | 12/2003 | Wang et al. | |
| 6,705,346 | B1 * | 3/2004 | Kordon | 137/625.5 |
| 2005/0102912 | A1 * | 5/2005 | Gallant et al. | 52/36.4 |

* cited by examiner

*Primary Examiner*—Hung Van Duong

(57) ABSTRACT

A latching mechanism comprising a bar hook moveably connected to a first component. The bar hook has a first position recessed within the first component and a second position projecting from the first component. A receptacle is disposed within a second component and engages the hook when the hook is in the second position. A magnet is disposed within the second component. The magnet moves the hook from the first position to the second position as the second component is disposed in close proximity to the first component. A sliding release mechanism is disposed within the second component and disengages the bar hook from the receptacle.

28 Claims, 3 Drawing Sheets

SLIDING LATCHING MECHANISM

BACKGROUND

Portable computers are compact, lightweight computing devices and may comprise any portable electronic device, for example, notebook computers, personal digital assistants, tablet personal computers, and laptop computers. Many portable computer systems utilize two rotatably connected components that can be arranged in opened or closed positions as desired. For example, notebook computer systems have a display panel that is rotatably connected to a main computer chassis. The display panel can be closed against the main chassis in a clam-shell type configuration that provides a compact package for portability and protects the screen and keyboard. Many systems include latching mechanisms that connect the display panel to the main body when the display panel is in the closed position.

Latching mechanisms that involve complicated operation, are difficult to use, or require two hands and/or considerable force to operate may not be desirable. Some latching mechanisms require user intervention to successfully engage the mechanism, increasing the difficulty of use. Many latching systems utilize one or more latching members that project above the surface of the system and are susceptible to being caught on something and possibly breaking.

BRIEF SUMMARY

Therefore, as can be appreciated, there is a need for a latching mechanism for portable computer systems that provides simple, compact, one-handed operation. The problems noted above are solved in large part by a latching mechanism comprising a bar hook moveably connected to a first component. The bar hook has a first position recessed within the first component and a second position projecting from the first component. A receptacle is disposed within a second component and engages the hook when the hook is in the second position. A magnet is disposed within the second component. The magnet moves the hook from the first position to the second position as the second component is disposed in close proximity to the first component. A sliding release mechanism is disposed within the second component and disengages the bar hook from the receptacle.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . "

DETAILED DESCRIPTION

Figure 1:
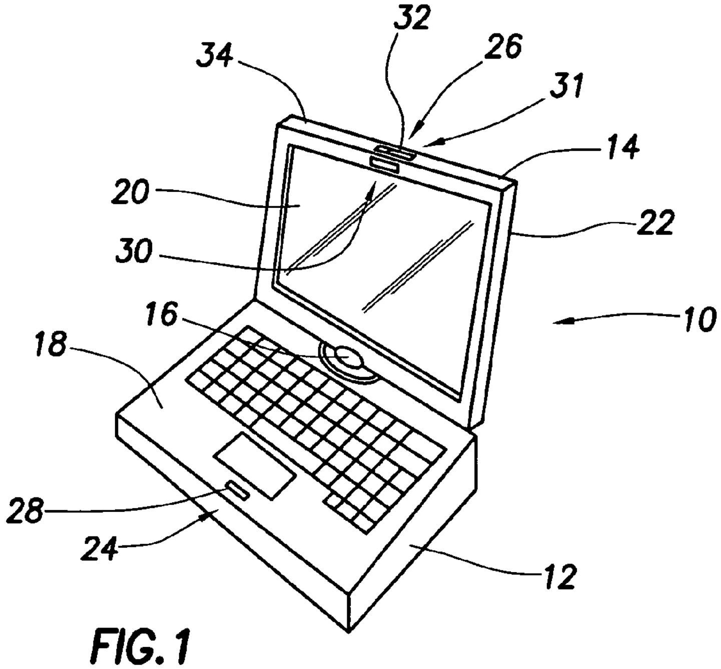
FIG. 1 shows a view of a portable computer system constructed in accordance with embodiments of the invention.

The following discussion is directed to various embodiments of the invention. Referring now to FIG. 1, a tablet portable personal computer 10 comprises a main chassis 12 connected to a display panel 14 at pivot connection 16. Pivot connection 16 enables display panel 14 to be placed flat against upper surface 18 of main chassis 12, with either screen side 20 or bezel side 22 facing the upper surface. In either orientation, it may be desirable to be able to temporarily fix display panel 14 to main chassis 12 to prevent unintentional movement.

Display panel 14 is attached to main chassis 12 in either orientation via the interaction of base latch 24 and display latch 26. Base latch 24 is disposed on main chassis 12 and extends through slot 28 on upper surface 18 of the main chassis. Display latch 26 is disposed on display panel 14 and comprises receiving slot 30 on screen side 20. Display latch 26 may also additionally, or alternatively, comprise receiving slot 31 on bezel side 22. Display latch 26 also comprises slider 32 on upper surface 34 of display panel 14.

Figure 2:
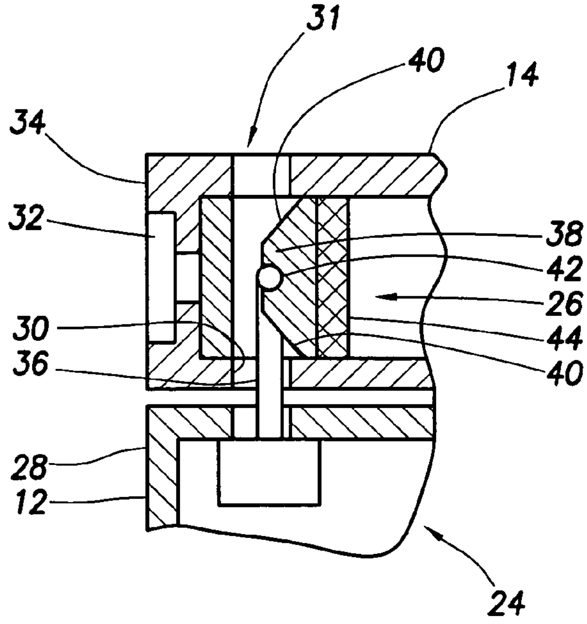
FIG. 2 shows a cross-sectional view of a latching mechanism constructed in accordance with embodiments of the invention.
Figure 3:
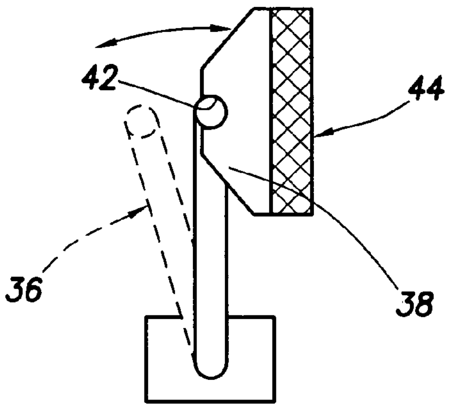
FIG. 3 shows a side elevation view of a bar hook and receptacle constructed in accordance with embodiments of the invention.

Referring now to FIG. 2, main chassis 12 and display panel 14 are shown in a latched position with base latch 24 engaged with display latch 26. Base latch 24 comprises bar hook 36 that extends from main chassis 12, through slot 28 on upper surface 18 and slot 30 on display panel 14. Display latch 26 comprises receptacle 38 that is connected to slider 32 and comprises angled sides 40, groove 42, and magnet 44. As illustrated in FIG. 3, magnet 44 attracts, moves, or urges bar hook 36 into groove 42 and maintains the engagement between receptacle 38 and the bar hook. The engagement of groove 42 and bar hook 36 prevents separation of main chassis 12 and display panel 14.

Figure 4:
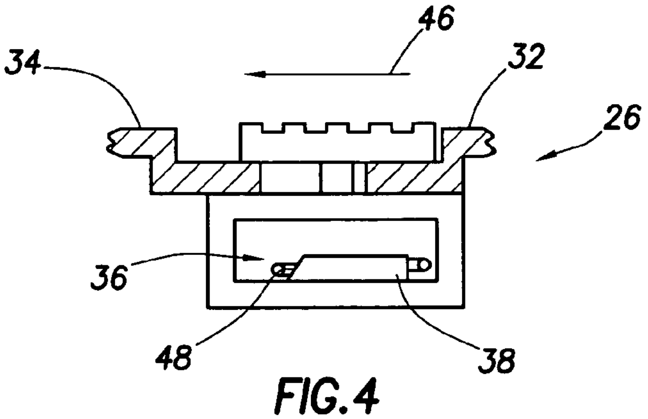
FIG. 4 shows a top section view of a latching mechanism constructed in accordance with embodiments of the invention.
Figure 5:
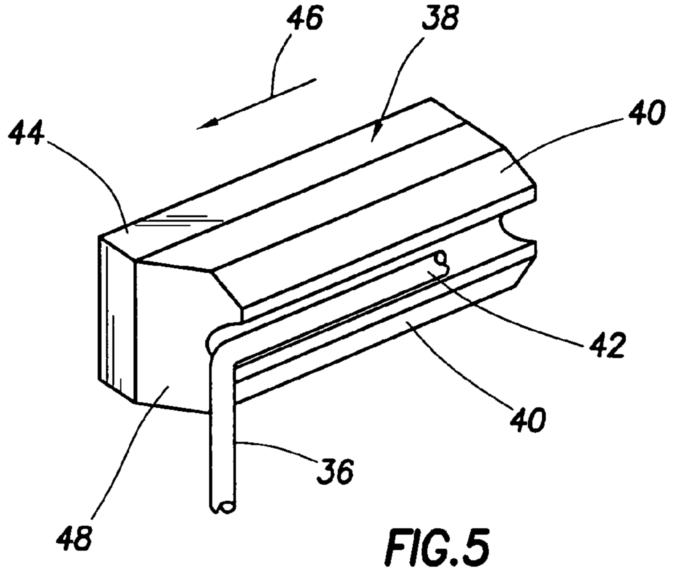
FIG. 5 shows an isometric view of a receptacle constructed in accordance with embodiments of the invention.

Referring now to FIGS. 4 and 5, display latch 26 is shown with bar hook 36 engaged with receptacle 38. To disengage display latch 26, slider 32 and receptacle 38 are moved in the direction indicated by arrow 46. Angled unlocking surface 48 of receptacle 38 engages one of the legs of bar hook 36. As the leg of bar hook 36 moves along angled unlocking surface 48, the surface urges the bar hook outward and out of engagement with groove 42, in the direction shown in FIG. 3. Thus, angled surface 48 acts as a wedge that acts against bar hook 36 to disengage the bar hook from receptacle 38. Once bar hook 36 has been disengaged from receptacle 38, main chassis 12 and display panel 14 can be separated.

Referring now to FIG. 5, an isometric view of receptacle 38 is shown. Receptacle 38 comprises angled sides 40, groove 42, magnet 44, and unlocking surface 48. Angled sides 40 serve to guide bar hook 36 (not shown) into groove 42 by urging the hook outward until properly aligned with the groove. Angled sides 40 may be on either side, or both sides, of groove 42 so as to enable engagement from either direction as the orientation of the components is adjusted. Unlocking surface 48 may be on only one end of receptacle 38 and is angled so as to urge bar hook 36 out of groove 42 as the receptacle is translated in a direction parallel to the groove.

Figure 6:
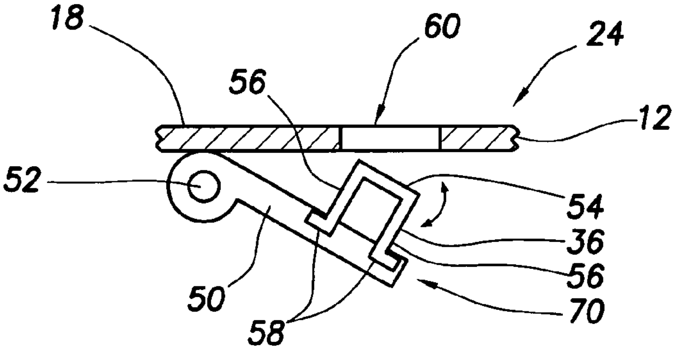
FIG. 6 shows an elevation view of a base latch constructed in accordance with embodiments of the invention.
Figure 7:
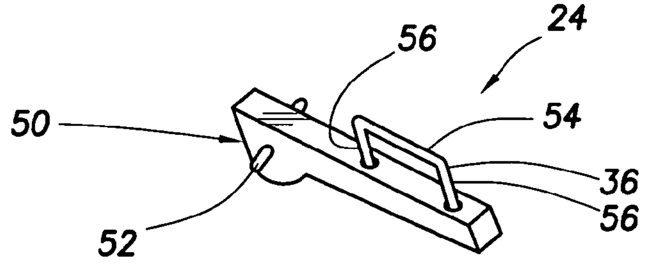
FIG. 7 shows an isometric view of a pivot arm and bar hook constructed in accordance with embodiments of the invention.

Referring now to FIGS. 6 and 7, one embodiment of base latch 24 comprises pivot arm 50 and bar hook 36. Pivot arm 50 is pivotally connected to main chassis 12 at pivot 52. Bar hook 36 is a U-shaped bar comprising an engaging portion 54, two extending portions 56, and two pivot connectors 58. Pivot connectors 58 pivotally attach bar hook 36 to pivot arm 50 and enable bar hook 36 to move into and out of engagement with receptacle 38 (see FIG. 3). Pivot arm 50 rotates about pivot 52 between a first position 70, where the arm and bar hook 36 are completely recessed within main chassis 12, and a second position, where the bar hook projects through slot 60. Pivot arm 50 may be spring-loaded, weight-biased, or otherwise biased to the first position 70 such that bar hook 36 does not project out of main chassis 12 except when under the influence of display latch 26 and magnet 44.

Figure 8:
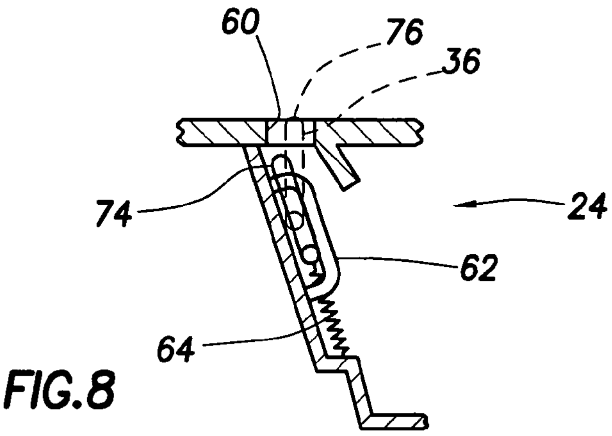
FIG. 8 shows a side elevation view of a base latch constructed in accordance with embodiments of the invention.
Figure 9:
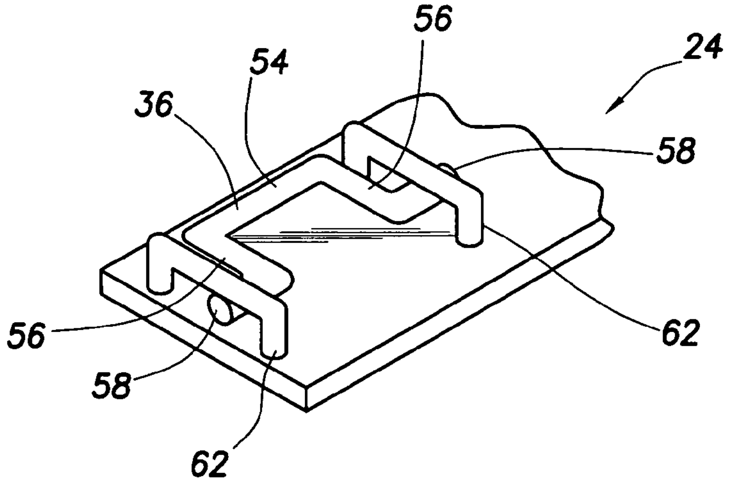
FIG. 9 shows an isometric view of a base latch constructed in accordance with embodiments of the invention.

Referring now to FIGS. 8 and 9, base latch 24 comprises bar hook 36 slidably mounted to retainers 62 that enable translation and rotation of the bar hook. Bar hook 36 is a U-shaped bar comprising an engaging portion 54, two extending portions 56, and two pivot connectors 58. Retainers 62 are attached to main chassis 12 and engage pivot connectors 58. Bar hook 36 rotates and translates between a first position 74, where the arm and bar hook 36 are completely recessed within main chassis 12, and a second position 76, where the bar hook projects through slot 60. Base latch 24 may also comprise spring 64 that biases bar hook 36 to the first position 74 such that bar hook 36 does not project out of main chassis 12 except when under the influence of display latch 26 and magnet 44.

Although described with reference to a tablet-type personal computer system, latching mechanism like those described herein could be used on a variety of other portable computer systems. Other portable computer systems that may utilize such mechanisms include, but are not limited to, notebook computer systems and portable digital assistants (PDAs).

The above discussion is meant to be illustrative of the principles and various embodiments of the present invention. Numerous variations and modifications will become apparent to those skilled in the art once the above disclosure is fully appreciated. For example, the orientation and arrangement of the bar hook and receptacle could be reversed such that the bar hook would be on the second component and the receptacle on the first component.

What is claimed is:

1. A latching mechanism comprising:

a bar hook moveably connected to a first component, wherein said bar hook has a first position recessed within the first component and a second position projecting from the first component;

a receptacle disposed within a second component, wherein said receptacle engages said hook when said hook is in the second position;

a magnet disposed within the second component, wherein said magnet moves said hook from the first position to the second position as the second component is disposed in close proximity to the first component; and a sliding release mechanism disposed within the second component, wherein said release mechanism disengages said bar hook from said receptacle.

2. The latching mechanism of claim 1 wherein said bar hook is biased to the first position.

3. The latching mechanism of claim 1 wherein said bar hook is weight-biased to the first position.

4. The latching mechanism of claim 1 further comprising a pivot arm that is pivotally attached to said first component, wherein said bar hook is pivotally attached to said pivot arm.

5. The latching mechanism of claim 1 further comprising a retainer that connects said bar hook to the first component, wherein said retainer enables said bar hook to translate and rotate relative to the first component.

6. The latching mechanism of claim 1 wherein said receptacle further comprises:

a groove that receives said bar hook; and an angled surface that guides said bar hook into said groove.

7. The latching mechanism of claim 1 wherein the first component is a main chassis of a tablet computer system and the second component is a display panel of a tablet computer system.

8. The latching mechanism of claim 1 wherein the first component is a main chassis of a portable computer system and the second component is a display panel of a portable computer system.

9. The latching mechanism of claim 2 further comprising a spring that biases said bar hook to the first position.

10. The latching mechanism of claim 6 wherein said sliding release mechanism further comprises a disconnecting surface disposed on said receptacle, wherein the disconnecting surface disengages said bar hook from said groove.

11. A portable computer system comprising:

a main chassis;

a display panel movably connected to said main chassis;

a bar hook moveably connected to said main chassis, wherein said bar hook has a recessed position within said main chassis and an extended position extending from said main chassis;

a receptacle disposed within said display panel, wherein said receptacle is operable to engage said bar hook when said display panel is adjacent to said main chassis;

a magnet disposed within said display panel, wherein said magnet moves said hook from the recessed position to the extended position as said display panel is disposed in close proximity to said main chassis; and a sliding release mechanism disposed within said display panel, wherein said sliding release mechanism is operable to disengage said bar hook from said receptacle.

12. The portable computer system of claim 11 further comprising;

a first slot in an upper surface of said main chassis; and a second slot in a display side of said display panel.

13. The portable computer system of claim 11 wherein said display panel comprises a display side and a bezel side.

14. The latching mechanism of claim 11 wherein said bar hook is biased to the first position.

15. The latching mechanism of claim 11 further comprising a spring that biases said bar hook to the first position.

16. The latching mechanism of claim 11 wherein said bar hook is weight-biased to the first position.

17. The latching mechanism of claim 11 further comprising a pivot arm that is pivotally attached to said main chassis, wherein said bar hook is pivotally attached to said pivot arm.

18. The latching mechanism of claim 11 further comprising a retainer that connects said bar hook to said main chassis, wherein said retainer enables said bar hook to translate and rotate relative to said main chassis.

19. The portable computer system of claim 12 wherein when the display side of said display panel is disposed adjacent to the upper surface of said main chassis, said bar hook extends through said first slot and said second slot.

20. The portable computer system of claim 13 wherein said display panel is pivotally connected to said main chassis such that either the display side or the bezel side of said display panel can be disposed adjacent to an upper surface of said main chassis.

21. The portable computer system of claim 13 further comprising a third slot through the bezel side of said display panel.

22. The latching mechanism of claim 17 wherein the first component is the main chassis of a portable computer system and the second component is a display panel moveably connected to the main chassis.

23. The latching mechanism of claim 17 wherein the first component is a main chassis of a tablet computer system and the second component is a display panel of a tablet computer system.

24. The portable computer system of claim 21 wherein when the bezel side of said display panel is disposed adjacent to an upper surface of said main chassis, said bar hook extends through said third slot.

25. A latching mechanism comprising:

means for moving a bar hook that is moveably disposed in a first component from a first position recessed within the first component to a second position extending from the first component as the first component is disposed adjacent to a second component;

means for engaging the bar hook, wherein said means for engaging is disposed within the second component;

means for disengaging the bar hook, wherein said means for disengaging is disposed within the second component; and means for retracting the bar hook into the first component as the first component is moved away from the second component.

26. The latching mechanism of claim 25 wherein said means for extending the bar hook operates automatically as the first component is disposed adjacent to the second component.

27. The latching mechanism of claim 26 wherein said means for engaging the bar hook operates automatically as the first component is disposed adjacent to the second component.

28. The latching mechanism of claim 27 wherein said means for retracting the bar hook operates automatically as the first component is moved away from the second component.

* * * * *